United States Patent
Kwon

(10) Patent No.: US 10,593,968 B2
(45) Date of Patent: Mar. 17, 2020

(54) FUEL CELL SYSTEM

(71) Applicants: HYUNDAI MOTOR COMPANY, Seoul (KR); KIA MOTORS CORPORATION, Seoul (KR)

(72) Inventor: Hyuck Roul Kwon, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 136 days.

(21) Appl. No.: 15/728,186

(22) Filed: Oct. 9, 2017

(65) Prior Publication Data
US 2018/0175408 A1 Jun. 21, 2018

(30) Foreign Application Priority Data
Dec. 16, 2016 (KR) .................. 10-2016-0173044

(51) Int. Cl.
*H01M 8/04089* (2016.01)
*H01M 8/04225* (2016.01)
(Continued)

(52) U.S. Cl.
CPC ... *H01M 8/04089* (2013.01); *H01M 8/04201* (2013.01); *H01M 8/04225* (2016.02); *H01M 8/04228* (2016.02); *H01M 8/04302* (2016.02); *H01M 8/04303* (2016.02); *H01M 8/1007* (2016.02); *H01M 8/04388* (2013.01); *H01M 8/04395* (2013.01); *H01M 2008/1095* (2013.01)

(58) Field of Classification Search
None
See application file for complete search history.

(56) References Cited

U.S. PATENT DOCUMENTS

2005/0208358 A1* 9/2005 Nishimura ........ H01M 8/04089
429/429

FOREIGN PATENT DOCUMENTS

KR 101240986 3/2013

OTHER PUBLICATIONS

"Lower and Upper Explosive Limits for Flammable Gases and Vapors (LEL/UEL)", www.mathesontrigas.com, Gas Data Book, 7th edition, © 2001 by Matheson Gas Products, Bulletin 627, "Flammability Characteristics of Combustible Gases and Vapors", © 1965 by U.S.Dept. of the Interior, Bureau of Mines., 1 page.
(Continued)

*Primary Examiner* — Daniel S Gatewood
(74) *Attorney, Agent, or Firm* — Lempia Summerfield Katz LLC

(57) ABSTRACT

A fuel cell system employs a fuel cell stack having an air electrode, an electrolyte membrane, and a fuel electrode. The fuel cell system includes an air residual space, from which air supplied to the air electrode is not discharged to stay behind therein when the fuel cell system is stopped. The air residual space communicates with the air electrode. The fuel cell system includes a hydrogen residual space, from which hydrogen supplied to the fuel electrode is not discharged to stay behind therein when the fuel cell system is stopped. The hydrogen residual space communicates with the fuel electrode. A residual ratio satisfies a specific reference range and corresponds to a ratio of the molecular number of hydrogen that stays behind in the hydrogen residual space to the molecular number of oxygen in air that stays behind in the air residual space when the fuel cell system is stopped.

11 Claims, 2 Drawing Sheets

(51) Int. Cl.
*H01M 8/1007* (2016.01)
*H01M 8/04303* (2016.01)
*H01M 8/04228* (2016.01)
*H01M 8/04082* (2016.01)
*H01M 8/04302* (2016.01)
*H01M 8/0438* (2016.01)
*H01M 8/1018* (2016.01)

(56) References Cited

OTHER PUBLICATIONS

"Revised Draft Global Technical Regulation (gtr) on Hydrogen and Fuel Cell Vehicles", Informal document WP.29-159-06 (159th WP.29, session Mar. 12-15, 2013, agenda item 16.5), 115 pages, United Nations ECE/TRANS/WP.29/GRSP/2012/23.
Hao Tang et al., "PEM Fuel Cell Cathode Carbon Corrosion Due to the Formation of Air/Fuel Boundary at the Anode", Journal of Power Sources, Nov. 28, 2005, pp. 1306-1312; www.elsevier.com/locate/jpowsour.

* cited by examiner

US 10,593,968 B2

FUEL CELL SYSTEM

CROSS-REFERENCE TO RELATED APPLICATION

This application is based on and claims the benefit of priority to Korean Patent Application No. 10-2016-0173044, filed on Dec. 16, 2016, in the Korean Intellectual Property Office, the disclosure of which is incorporated herein in its entirety by reference.

TECHNICAL FIELD

The present disclosure relates to a fuel cell system.

BACKGROUND

A fuel cell system employs a fuel cell stack having an air electrode, an electrolyte electrode, and a fuel electrode. While the fuel cell system is operated, air is supplied to an air electrode and hydrogen is supplied to a fuel electrode.

However, if air stays behind in the interior of the system after the system is stopped, carbon corrosion due to oxygen in the air may occur. This may lower the durability of the fuel cell stack, and thus is not desirable. Further, if too much hydrogen stays behind in the interior of the system after the system is stopped, a concentration of hydrogen increases too much in the gases discharged when the system is restarted and thus a danger of a fire or an explosion may increase, which is undesirable.

SUMMARY

The present disclosure describes a fuel cell system that may properly adjust an amount of oxygen or hydrogen that stays behind in the interior of the system.

The technical objects of the present disclosure are not limited to the above-mentioned one. The other unmentioned technical objects will become apparent to those having ordinary skill in the art from the following description.

In accordance with an aspect of the present disclosure, a fuel cell system employs a fuel cell stack having an air electrode, an electrolyte membrane, and a fuel electrode. The fuel cell system includes an air residual space, from which air supplied to the air electrode is not discharged to stay behind therein when the fuel cell system is stopped. The air residual space communicates with the air electrode. The fuel cell system includes a hydrogen residual space, from which hydrogen supplied to the fuel electrode is not discharged to stay behind therein when the fuel cell system is stopped. The hydrogen residual space communicates with the fuel electrode, wherein a residual ratio satisfies a specific reference range. The residual ratio corresponds to a ratio of the molecular number of hydrogen that stays behind in the hydrogen residual space to the molecular number of oxygen in air that stays behind in the air residual space when the fuel cell system is stopped.

In accordance with another aspect of the present disclosure, a fuel cell system employs a fuel cell stack having an air electrode, an electrolyte membrane, and a fuel electrode. The fuel cell system includes an air residual space, from which air supplied to the air electrode is not discharged to stay behind therein when the fuel cell system is stopped. The air residual space communicates with the air electrode. The fuel cell system includes a hydrogen residual space, from which hydrogen supplied to the fuel electrode is not discharged to stay behind therein when the fuel cell system is stopped. The hydrogen residual space communicates with the fuel electrode. The fuel cell system includes a control unit configured to perform at least one of a control of whether air is to be supplied to the air residual space, a control of whether air is to be discharged from the air residual space, a control of whether hydrogen is to be supplied to the hydrogen residual space, and a control of whether hydrogen is to be discharged from the hydrogen residual space. The control unit performs at least one of the controls, based on a residual ratio corresponding to a ratio of the molecular number of hydrogen that stays behind in the hydrogen residual space to the molecular number of oxygen in air that stays behind in the air residual space after the fuel cell system is stopped.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
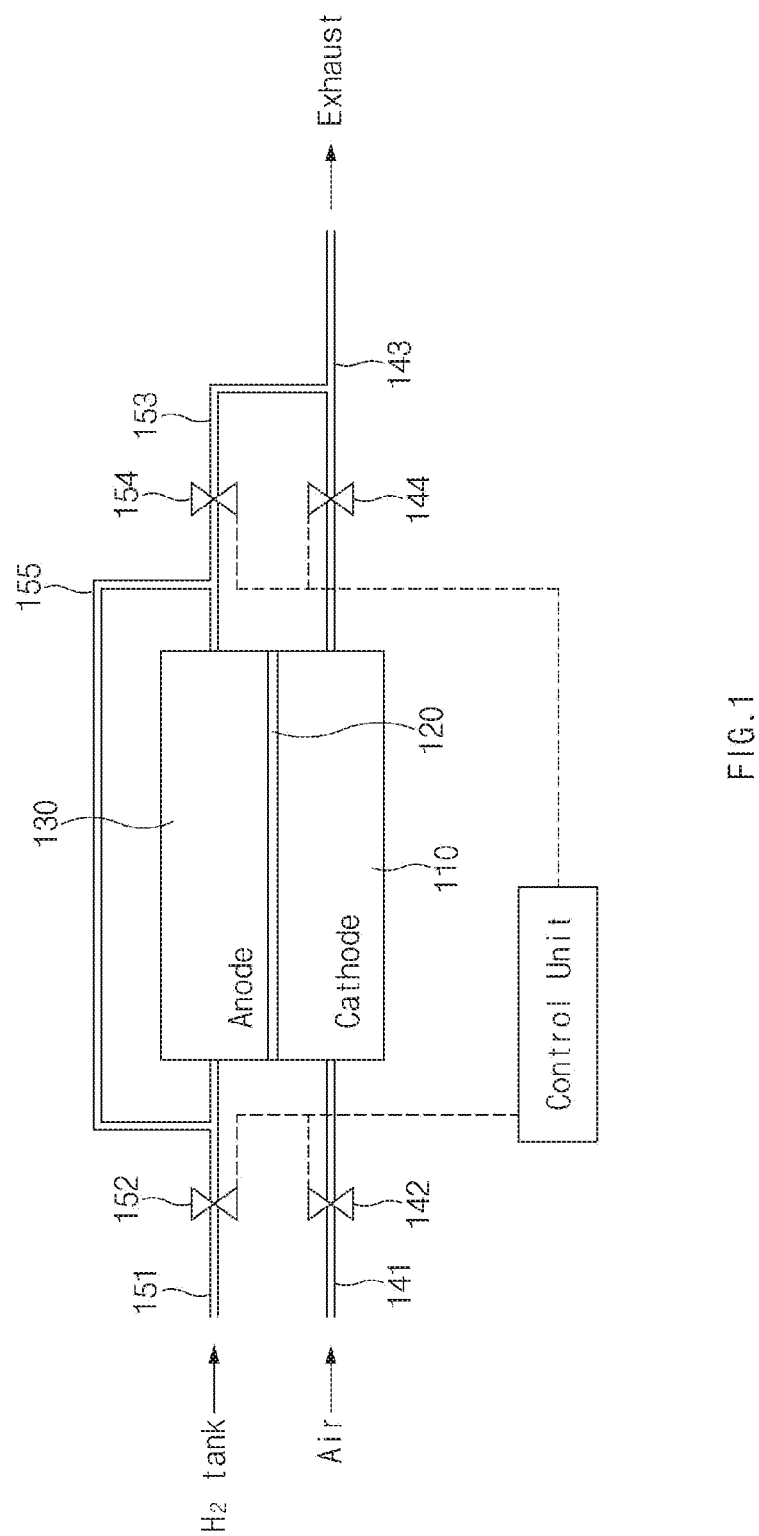
FIG. 1 is a conceptual view illustrating a fuel cell system according to a first embodiment of the present disclosure.

Hereinafter, embodiments of the present disclosure are described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

Embodiment 1

FIG. 1 is a conceptual view illustrating a fuel cell system according to a first embodiment of the present disclosure. A fuel cell system according to the present disclosure employs a fuel cell stack having an air electrode 110, an electrolyte membrane 120, and a fuel electrode 130.

During an operation of the fuel cell system, air containing oxygen is supplied to the air electrode 110 of the fuel cell stack, and hydrogen is supplied to the fuel electrode 130 of the fuel cell stack. Further, when the fuel cell system is stopped, valves, which are described below, may close supply lines 141 and 151 and discharge lines 143 and 153. As the lines 141, 151, 143, and 153 are closed, air or hydrogen may stay behind in the interior of the system.

However, if air stays behind in the interior of the system, carbon corrosion may occur due to oxygen in the air. Carbon, which is widely used as a catalyst support of a membrane electrode assembly may be corroded by oxygen in an environment in an initial startup stage. This may lower the durability of the fuel cell stack, and thus is not desirable. To prevent this, oxygen of the air electrode 110 may be removed through hydrogen of the fuel electrode 130 by operating cathode oxygen depletion (COD) when the system is stopped.

Further, if too much hydrogen stays behind in the interior of the system, a concentration of hydrogen increases too much in the gases discharged when the system is restarted and thus a danger of a fire or an explosion may increase. In the case of a fuel cell vehicle, a concentration of hydrogen in exhaust gases may be legally regulated to a specific value or less as a safety requirement.

The fuel cell system according to this embodiment relates to technology for preventing in advance the problems due to oxygen staying and an excess of hydrogen staying. In more detail, the fuel cell system according to the present embodiment relates to technology for preventing the above-mentioned problems by maintaining a mole fraction of oxygen and hydrogen within a specific range that stay behind in the interior of the system after the system is stopped. In particular, a basic feature of the fuel cell system according to the present embodiment is to specifically adjust a ratio of the volume of a space in which air stays behind and the volume of a space in which hydrogen stays behind to realize the above-mentioned technology.

Hereinafter, the feature of the system according to the present embodiment is described in more detail.

Stay Spaces

The fuel cell system according to the present embodiment includes an air residual space and a hydrogen residual space. In the specification, the air residual space is a space in which air supplied to the air electrode 110 stays behind without being discharged when the system is stopped, and refers to a space that communicates with the air electrode 110. Further, the hydrogen residual space is a space in which hydrogen supplied to the fuel electrode 130 stays behind without being discharged when the system is stopped, and refers to a space that communicates with the fuel electrode 130.

Hereinafter, reference is made to FIG. 1. For example, the air residual space may be defined in a space between an air supply valve 142 and an air discharge valve 144. The hydrogen residual space may be defined as a space between a hydrogen supply valve 152 and a hydrogen discharge valve 154. This is described in more detail below.

Air is supplied to the air electrode 110. To achieve this, the air supply line 141 is provided that supplies external air to the air electrode 110. The air supply line 141 may be provided with a filter (not illustrated), a blower (not illustrated), a humidifier (not illustrated), and an air supply valve 142. The air supply valve 142 is installed close to the fuel cell stack to determine whether air will be supplied to the air electrode 110 by opening and closing the air supply line 141.

The air supplied to the air electrode 110 is discharged to the outside after a reaction. To achieve this, the air discharge line 143 is provided that discharges residual air of the air electrode 110 to the outside. The air discharge valve 144 may be provided in the air discharge line 143. The air discharge valve 144 is installed close to the fuel cell stack to determine whether air will be discharged from the air electrode 110 by opening and closing the air discharge line 143.

Hydrogen is supplied to the fuel electrode 130. To achieve this, the hydrogen supply line 151 is provided that supplies hydrogen of a hydrogen tank to the fuel electrode 130. The hydrogen supply valve 152 may be provided in the hydrogen supply line 151. The hydrogen supply valve 152 is installed close to the fuel cell stack to determine whether hydrogen will be supplied to the fuel electrode 130 by opening and closing the hydrogen supply line 151.

The hydrogen supplied to the fuel electrode 130 is discharged to the outside after a reaction. To achieve this, the hydrogen discharge line 153 is provided that discharges residual hydrogen of the fuel electrode 130 to the outside. The hydrogen discharge valve 154 may be provided in the hydrogen discharge line 153. The hydrogen discharge valve 154 is installed close to the fuel cell stack to determine whether hydrogen will be discharged from the fuel electrode 130 by opening and closing the hydrogen discharge line 153.

Some of the hydrogen of the hydrogen discharge line 153 may be supplied to the fuel electrode 130 again. To achieve this, a hydrogen recovery line 155 may be provided, which interconnects the hydrogen discharge line 153 and the hydrogen supply line 151. The hydrogen recovery line 155 may interconnect a front end of the hydrogen discharge valve 154 with respect to a hydrogen discharge direction and a rear end of the hydrogen supply valve 152 with respect to a hydrogen supply direction.

All the valves are usually opened while the fuel cell stack is operated. However, all the valves may be closed when the fuel cell stack is stopped. The closing of the valves causes air to stay behind in a space between the air supply valve 142 and the air discharge valve 144. The closing of the valves also causes hydrogen to stay behind in a space between the hydrogen supply valve 152 and the hydrogen discharge valve 154.

The residual spaces may be defined by the spaces between the above-mentioned valves. More specifically, the residual spaces may include spaces defined by pipes between the valves and the fuel cell stack, spaces defined by manifolds of separators that constitute the fuel cell stack, and spaces defined between the separators and the air electrode 110 and the fuel electrode 130.

Residual Ratio

In the specification, the residual ratio is defined by a ratio of the molecular number of hydrogen that stays behind in the hydrogen residual space to the molecular number of oxygen in air that stays behind in the air residual space when the system is stopped. In other words, the residual ratio may be defined by (the molecular number of hydrogen in the hydrogen residual space)/(the molecular number of oxygen in the air residual space) when the system is stopped.

Reference Range of Residual Ratio

Figure 2:
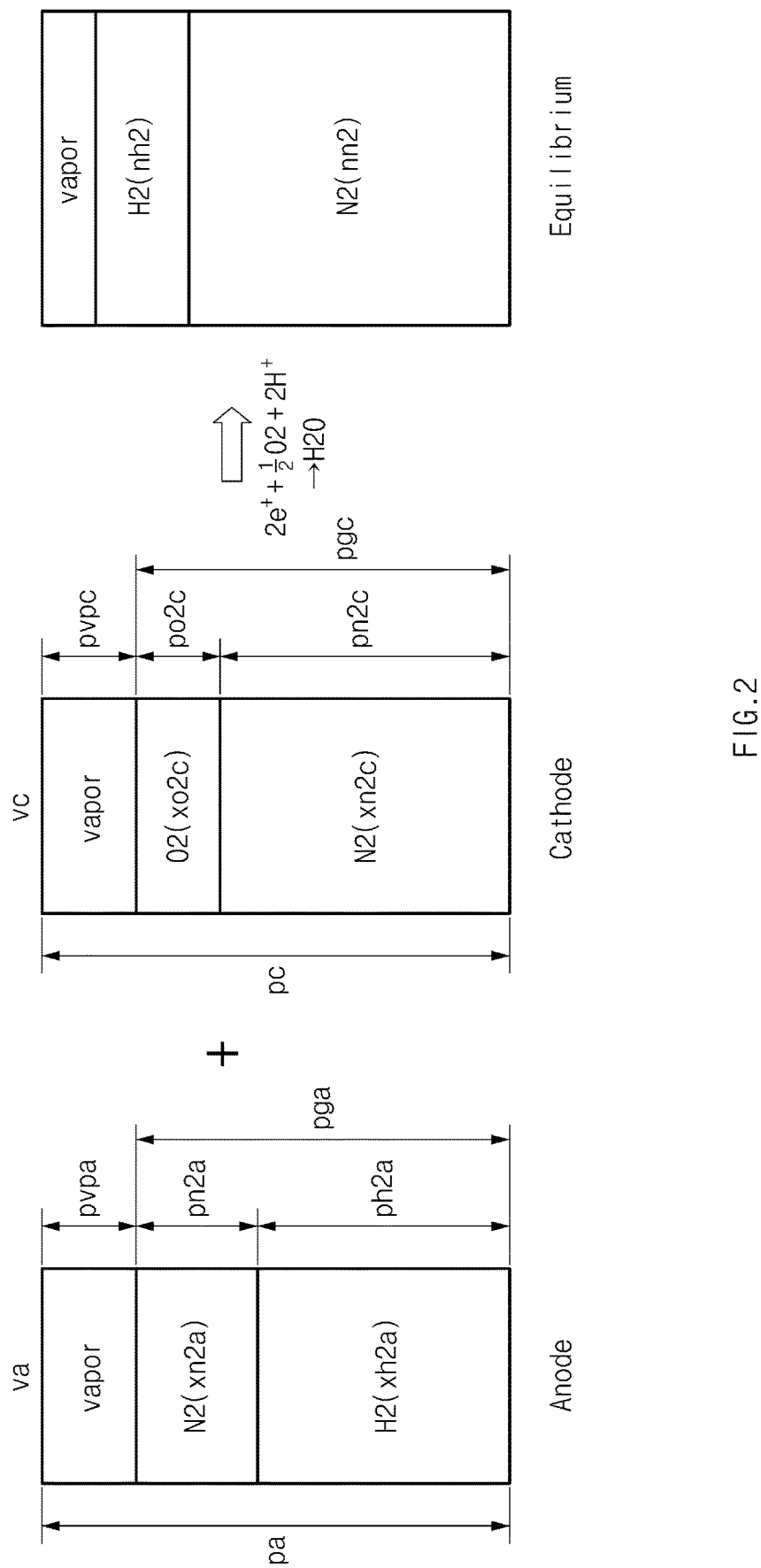
FIG. 2 is a conceptual view illustrating states of a hydrogen residual space and an air residual space when the fuel cell system is stopped, and illustrating states of the spaces that reach an equilibrium state after a time elapses.

The basic feature of the system according to the present embodiment is to set a residual ratio such that the residual ratio may satisfy a specific reference range. Hereinafter, the reference range is described in detail with reference to FIG. 2. FIG. 2 is a conceptual view illustrating states of a hydrogen residual space and an air residual space when the fuel cell system is stopped, and illustrating states of the spaces that reach an equilibrium state after a time elapses.

As illustrated in FIG. 2, after the fuel cell system is stopped, vapor, nitrogen, and hydrogen stay behind in the hydrogen residual space. The vapor in the hydrogen residual space is vapor that stays behind after water or vapor, which is generated by a chemical reaction in the air electrode 110, passes through the electrolyte membrane 120 to the hydrogen residual space. The nitrogen in the hydrogen residual space is also nitrogen that stays behind after nitrogen in the air, which is supplied to the air electrode 110, passes through the electrolyte membrane 120 to the hydrogen residual space. Oxygen and nitrogen in the air supplied to the air electrode 110, and the vapor generated by a chemical reaction, stay behind in the air residual space.

After the fuel cell system is stopped, the gases in the air residual space and the gases in the hydrogen residual space pass through the electrolyte membrane 120 and are mixed with each other. This is called cross-over. Through the mixing, oxygen and hydrogen react with each other to generate water. Then, oxygen and hydrogen react with each other at a mole fraction of 1:2. Accordingly, the molecular numbers may be adjusted, as desired, of the residual oxygen and the residual hydrogen that stay behind in the residual spaces in an equilibrium state after the water generating reaction. The molecular numbers may be adjusted by specifically adjusting the molecular numbers of oxygen and hydrogen that stay behind in the residual spaces when the system is stopped.

In the present embodiment, the reference range is determined by using the above-mentioned principle.

First, the reference range may be set to a range in which oxygen does not stay behind in the residual spaces after oxygen and hydrogen pass through the electrolyte membrane 120 to react with each other after the system is stopped. To achieve this, considering that oxygen and hydrogen react with each other at a mole fraction of 1:2 in a water generating reaction, it may be preferable that the residual ratio of (the molecular number of hydrogen)/(the molecular number of oxygen) be not less than 2. In other words, it may be preferable that a lower limit of the reference range be 2. As the reference range is set in this way, oxygen may not stay behind in the residual spaces in an equilibrium state. Accordingly, the system according to the present embodiment may prevent the problems due to the staying of oxygen.

Next, the reference range may be set to a range in which a concentration of hydrogen in the gases that is left in the residual spaces when the system is restarted is not more than a specific reference concentration, after oxygen and hydrogen pass through the electrolyte membrane 120 to react with each other after the system is stopped.

When the concentration of hydrogen is excessive in the gases discharged when the fuel cell system is restarted, there occurs a danger of a fire or an explosion. In order to prevent this, in the case of a fuel cell vehicle, an average concentration of hydrogen in exhaust gases for 3 seconds may be regulated to not more than 4%. Further, an instantaneous concentration of hydrogen then may be regulated to not more than 8%.

In order to satisfy the concentration, an upper limit of the reference range may be determined to be 2.2 or 2.4, in one example. As the reference range is set in this way, the concentration of hydrogen in the gases discharged when the fuel cell system is restarted may become not more than 4% or not more than 8%. Accordingly, the system according to the present embodiment may prevent the problems due to the excessive staying of hydrogen. The upper limit is described in detail below. For reference, 4% or 8% may correspond to the reference concentration of the specification.

Determination of Volume Ratio of Residual Spaces

As is described below in detail, if the system is designed such that the volume ratio of the residual spaces is specifically determined, the above-mentioned residual ratio may satisfy the above-mentioned reference range. The system according to the present embodiment is based on such a design. Hereinafter, reference is made to FIG. 2.

For reference, the reference numerals of FIG. 2 or the following equations have the following meanings. The reference numerals, which are not described in the following tables, may be interpreted by the same rules of the reference numerals described in the following tables. Further, in the following tables, an anode may be a hydrogen residual space and a cathode may be an air residual space.

TABLE 1

| Classification | Details |
| --- | --- |
| rha/rhc | Relative humidity (RH) of anode/relative humidity (RH) of cathode |
| ta/tc | Temperature (° C.) of anode/temperature (° C.) of cathode |
| xn2a | Concentration of N2 in anode Nitrogen/(hydrogen + nitrogen) |
| xh2a | Concentration of H2 in anode Hydrogen/(hydrogen + nitrogen) |
| xo2c | Concentration of O2 in cathode Oxygen/(oxygen + nitrogen) |
| xn2c | Concentration of N2 in cathode Nitrogen/(oxygen + nitrogen) |
| pvpa/pvpc | Anode vapor pressure/cathode vapor pressure |
| pa/pc | Anode total pressure/cathode total pressure |
| va/vc | Anode total volume/cathode total volume |
| R | General gas constant |
| Vapor of anode | Determined by ta, pa, and rha |
| Vapor of cathode | Determined by tc, pc, and rhc |
| Vapor in equilibrium state | Determined by T, P, and RH |

After the fuel cell system is stopped, the gases in the air residual space and the gases in the hydrogen residual space pass through the electrolyte membrane 120 and react with each other. Accordingly, if a time elapses after the system is stopped, the air residual space and the hydrogen residual space may be treated as one space that reached an equilibrium state depicted as "Equilibrium" in FIG. 2. Because an object of the system according to the present embodiment is to prevent oxygen from staying behind in the residual spaces after the system is stopped, it is assumed that oxygen is not left in the residual spaces in an equilibrium state after a water generating reaction.

According to an ideal gas state equation, the molecular number of the residual hydrogen left in the residual spaces in an equilibrium state after a water generating reaction may be expressed as in Equation 1. The molecular number of the residual nitrogen left in the residual spaces may be expressed as in Equation 2.

$$nh2(\text{mole}) = \text{anode } H2(\text{mole}) - 2 \times \text{cathode } O2(\text{mole}) = \quad \text{[Equation 1]}$$
$$H_2 - 2O_2 = \frac{ph2a \times va}{R \times ta} - 2 \times \frac{po2c \times vc}{R \times tc}$$

$$nn2(\text{mole}) = \frac{pn2a \times va}{R \times ta} + \frac{pn2c \times vc}{R \times tc} \quad \text{[Equation 2]}$$

Further, the concentration of hydrogen in the equilibrium state may be expressed as in Equation 3.

$$xh2 = \frac{nh2}{nh2 \times nn2} \quad \text{[Equation 3]}$$

Equation 4 is obtained by arranging the above equations.

$$\left[\left(\frac{pn2a \times va}{R \times ta} + \frac{pn2c \times vc}{R \times tc}\right) + \left(\frac{ph2a \times va}{R \times ta} - 2 \times \frac{po2c \times vc}{R \times tc}\right)\right] \times \quad \text{[Equation 4]}$$
$$xh2 = \left[\frac{ph2a \times va}{R \times ta} - 2 \times \frac{po2c \times vc}{R \times tc}\right]$$

The pressures of the gases in the air electrode 110 and the fuel electrode 130 may be expressed as in Equation 5.

$$pn2a = xn2a \times pga,$$

$$pn2c = xn2c \times pgc,$$

$$ph2a = xh2a \times pga,$$

$$po2c = xo2c \times pgc \quad \text{[Equation 5]}$$

Equation 6 is obtained by inserting Equation 5 into Equation 4.

$$\frac{pga \times va}{ta} \bigg/ \frac{pgc \times vc}{tc} = \frac{(2 \times xo2c - xn2c) \times xh2 - 2 \times xo2c}{(xh2a + xn2a) \times xh2 - xh2a} \quad \text{[Equation 6]}$$

Equation 7 is obtained by arranging Equation 6.

$$\frac{pga \times va}{ta} = \frac{(2 \times xo2c - xn2c) \times xh2 - 2 \times xo2c}{(xh2a + xn2a) \times xh2 - xh2a} \times \frac{pgc \times vc}{tc} \quad \text{[Equation 7]}$$

Equation 9 is obtained by arranging Equation 7 by using Equation 8.

$$\text{let's } \delta = \frac{(2 \times xo2c - xn2c) \times xh2 - 2 \times xo2c}{(xh2a + xn2a) \times xh2 - xh2a} \quad \text{[Equation 8]}$$

$$\frac{va}{vc} = \delta \times \frac{pgc}{tc} \times \frac{ta}{pga} \quad \text{[Equation 9]}$$

Equation 7 may be arranged as an equation for the pressure (pga) of the gases in the hydrogen residual space or an equation for the concentration (xh2a) of hydrogen in the hydrogen residual space as in Equation 10 or 11, based on a parameter value that is to be adjusted.

$$pga = \delta \times \frac{pgc \times vc}{tc} \times \frac{ta}{va} \quad \text{[Equation 10]}$$

$$xh2a = xh2 + \frac{(xn2c - 2 \times xo2c) \times xh2 + 2 \times xo2c}{\delta} \quad \text{[Equation 11]}$$

Accordingly, if the gas pressure pgc, the temperature tc, the oxygen concentration xo2c, and the nitrogen concentration xn2c of the air electrode 110 are known when the system is stopped, and if the gas pressure pga, the temperature ta, the hydrogen concentration xh2a, and the nitrogen concentration xn2a of the fuel electrode 130 are known when the system is stopped, a ratio of the volume va of the hydrogen residual space to the volume vc of the air residual space, by which oxygen does not stay behind and hydrogen corresponding to a desired concentration xh2 stays behind in an equilibrium state after a water generating reaction, may be determined based on Equation 9.

However, the gas pressure and the like appear similarly whenever the system is stopped. Accordingly, when the fuel cell system is designed, a ratio va/vc of the volumes may be determined, by which oxygen does not stay behind in the residual spaces and hydrogen corresponding to a desired concentration xh2 stays behind in an equilibrium state after a water generating reaction.

For example, the ratio va/vc of the volumes may be determined by identifying the values pgc, tc, xo2c, xn2c, pga, ta, xh2a, and xn2a, such as the gas pressure, when the system is stopped through an experimental method and inserting the values into Equation 9, and by determining a desired hydrogen concentration xh2 and inserting the hydrogen concentration xh2 into Equation 9. This may mean that if the fuel cell system is designed after determining the ratio of the volumes, the hydrogen concentration of the gases discharged when the system is restarted may be approximately xh2.

For example, in order to maintain the concentration of hydrogen that stays behind in an equilibrium state after the water generating reaction at 0%, the system has only to be designed based on the ratio of the volumes obtained by inserting the following values into Equation 9. The ratio va/vc of the volumes calculated based on the following values is 0.60.

TABLE 2

| Classification | | Values | Note |
| --- | --- | --- | --- |
| Relative humidity (RH) of anode | Rha | 45% | Assumed value |
| Temperature (° C.) of anode | Ta | 65° C. | Common value when system is stopped |
| Concentration of N2 in anode | xn2a | 30% | Assumed value |
| Concentration of H2 in anode | xh2a | 70% | Assumed value |
| Vapor pressure (0) of anode | Pvpa | 11.3 kPa | Calculated value |
| Total pressure of anode | Pa | 100 kPa | Common value when system is stopped |
| Total volume of anode | Va | ?? L | |
| Relative humidity (RH) of cathode | Rhc | 45% | Assumed value |
| Temperature (° C.) of cathode | Tc | 65° C. | Common value when system is stopped |
| Concentration of O2 in cathode | xo2c | 21% | Common value when system is stopped |
| Concentration of N2 in cathode | xn2c | 79% | Common value when system is stopped |
| Vapor pressure (0) of cathode | Pvpc | 11.27 kPa | Calculated value |
| Total pressure of cathode | Pc | 100 kPa | Common value when system is stopped |
| Total value of cathode | Vc | ?? L | |
| (Target) concentration of hydrogen | xh2 | 0% | |

The pressure may be converted by using Equation 12. The vapor pressure of the anode and the vapor pressure of the cathode may be calculated by using Equations 13 and 14, which are general equations.

$$\begin{aligned} pa &= pga + pvpa, \\ pc &= pgc + pvpc, \\ pga &= pn2c + ph2a, \\ pgc &= po2c + pn2c \end{aligned} \quad \text{[Equation 12]}$$

$$pvpa = rha \times 0.611 \times 10^{\left(\frac{7.5 \times ta}{237.3 \times ta}\right)} \text{ (kPa)} \quad \text{[Equation 13]}$$

$$pvpc = rhc \times 0.611 \times 10^{\left(\frac{7.5 \times tc}{237.3 \times tc}\right)} \text{ (kPa)} \quad \text{[Equation 14]}$$

For reference, among the values, the concentration xo2c in the air electrode may be 21%, which corresponds to the concentration of oxygen in external air. This is a common value when the system is stopped. Because oxygen and nitrogen exist in the air electrode, the concentration xn2c of nitrogen in the air electrode may be 79%. Further, the relative humidity of the fuel electrode and the air electrode may be assumed in consideration of a general environment when the system is stopped.

Meanwhile, because nitrogen in the air electrode continues to pass through the electrolyte membrane, the concentration of nitrogen in the fuel electrode may become gradually higher. However, this is not desirable. Accordingly, the concentration of hydrogen in the fuel electrode may be constantly maintained. Among the values, the concentration xh2a of hydrogen in the fuel electrode may be a target concentration of hydrogen for the control. Because hydrogen and nitrogen exist in the fuel electrode, the concentration xn2a of nitrogen in the fuel electrode may be calculated from the concentration of hydrogen in the fuel electrode.

Further, in order to maintain the concentration of hydrogen that stays behind in an equilibrium state after the water generating reaction at 4%, the system has only to be designed based on the ratio of the volumes obtained by inserting the following values into Equation 9. The ratio va/vc of the volumes calculated based on the following values is 0.659.

TABLE 3

| Classification | | Values | Note |
|---|---|---|---|
| Relative humidity (RH) of anode | rha | 45% | Assumed value |
| Temperature (° C.) of anode | ta | 65° C. | Common value when system is stopped |
| Concentration of N2 in anode | xn2a | 30% | Assumed value |
| Concentration of H2 in anode | xh2a | 70% | Assumed value |
| Vapor pressure (0) of anode | pvpa | 11.3 kPa | Calculated value |
| Total pressure of anode | pa | 100 kPa | Common value when system is stopped |
| Total volume of anode | va | ?? L | |
| Relative humidity (RH) of cathode | rhc | 45% | Assumed value |
| Temperature (° C.) of cathode | tc | 65° C. | Common value when system is stopped |
| Concentration of O2 in cathode | xo2c | 21% | Common value when system is stopped |
| Concentration of N2 in cathode | xn2c | 79% | Common value when system is stopped |
| Vapor pressure (0) of cathode | pvpc | 11.27 kPa | Calculated value |
| Total pressure of cathode | pc | 100 kPa | Common value when system is stopped |
| Total value of cathode | vc | ?? L | |
| (Target) concentration of hydrogen | xh2 | 4% | |

As a result, if the fuel cell system is designed such that the ratio va/vc of the volumes satisfies a range of 0.600 to 0.659, oxygen does not exist but hydrogen exists corresponding to a concentration range of 0 to 4% in an equilibrium state after the water generating reaction. This is based on a common state when the system is stopped, and the state when the system is stopped may be changed depending on an operation state. Accordingly, a control according to a second embodiment, which is described below, may be performed. For reference, if any volume of the residual spaces is determined, another volume may be determined based on the above ratio.

For reference, the upper limit of the reference range may be determined as follows. Considering Equation 1, Equation 3 may be represented as in Equation 15. (Here, Px denotes a partial pressure of x in the air residual space or the hydrogen residual space.)

$$xh2 = \frac{nh2}{nh2+nn2} = \frac{(Ph2 \times Va) - 2 \times (Po2 \times Vc)}{((Ph2 \times Va) - 2 \times (Po2 \times Vc)) + (Pn2 \times Vc)} \quad \text{[Equation 15]}$$

If the residual ratio nh2/no2 is represented by α, Equation 15 may be represented as in Equation 16.

$$xh2 = \quad \text{[Equation 16]}$$
$$\frac{nh2}{nh2+nn2} = \frac{(Ph2 \times Va) - 2 \times (Po2 \times Vc)}{((Ph2 \times Va) - 2 \times (Po2 \times Vc)) + (Pn2 \times Vc)} =$$
$$\frac{(\alpha \times Po2 \times Vc) - 2 \times (Po2 \times Vc)}{(\alpha \times Po2 \times Vc - 2 \times (Po2 \times Vc)) + (Pn2 \times Vc)} =$$
$$\frac{(\alpha \times Po2) - 2 \times (Po2)}{(\alpha \times Po2 - 2 \times Po2) + (Pn2)}$$

If Equation 16 is arranged by using Equation 17, it may be represented as in Equation 18.

$$Pn2 = \frac{0.79}{0.21} \times Po2 \quad \text{[Equation 17]}$$

$$xh2 = \frac{\alpha - 2}{\alpha - 2 + (0.79/0.21)} \quad \text{[Equation 18]}$$

As a result, when xh2 is to be 0.04, α may be determined to be 2.16, and when xh2 is to be 0.08, α may be determined to be 2.33. Accordingly, the upper limit of the reference range may be determined to be 2.2 or 2.4 in consideration of an actual operation environment.

Embodiment 2

The fuel cell system according to the second embodiment differs from the fuel cell system according to the first embodiment in that a residual ratio is actively adjusted through a control unit.

The control unit of the present embodiment performs at least one of a control of whether air is to be supplied to an air residual space, a control of whether air is to be discharged from the air residual space, a control of whether hydrogen is to be supplied to a hydrogen residual space, and a control of whether hydrogen is to be discharged from the hydrogen residual space.

This embodiment, including the control unit, is described in more detail as follows.

In the present embodiment, the control unit may identify a residual ratio before the system is completely stopped. The control unit then may perform a control to supply air into the air residual space until the residual ratio reaches at least the upper limit when the residual ratio (the molecular number of hydrogen/the molecular number of oxygen) exceeds the upper limit of the reference range. For example, the control unit may additionally supply air into the air residual space by closing the air discharge valve 144 and opening the air supply valve 142. Through the control, the control unit according to the present embodiment may actively adjust the residual ratio to the reference range whenever the system is stopped.

When the residual ratio exceeds the upper limit of the reference range, the control unit may perform a control to discharge hydrogen from the hydrogen residual space until the residual ratio reaches at least the upper limit. For example, the control unit may discharge hydrogen from the hydrogen residual space by closing the hydrogen supply valve 152 and opening the hydrogen discharge valve 154. Any one or both of the supply of air and the discharge of hydrogen may be performed.

When the residual ratio is less than the lower limit of the reference range, the control unit may discharge air through a control of the air discharge valve 144 until the residual ratio reaches at least the lower limit. Separately, or at the same time, the control unit may supply hydrogen through a control of the hydrogen supply valve 152 until the residual ratio reaches at least the lower limit.

The controls may be performed based on the pressure of the gases in the air residual space or the molecular number of oxygen in the air residual space. Further, the controls may be performed based on the pressure of the gases in the hydrogen residual space or the molecular number of hydrogen in the hydrogen residual space. In order to perform the controls, sensors for measuring values that are necessary to calculate Equation 10 may be further provided.

More specifically, if the state when the system is stopped is as follows when a concentration of hydrogen that stays behind in an equilibrium state after a water generating reaction is to be maintained at 0%, a target pressure may be calculated by inserting the following values into Equation 10 and into Equations 12-14. The control unit may perform at least one of the controls based on the target pressure. When being calculated based on the following values, the total pressure pc of the air residual space and the total pressure pa of the hydrogen residual space may be 100 kPa, respectively.

TABLE 4

| Classification | | Values | Note |
| --- | --- | --- | --- |
| Relative humidity (RH) of anode | Rha | 45% | Assumed value |
| Temperature (° C.) of anode | Ta | 65° C. | Common value when system is stopped |
| Concentration of N2 in anode | xn2a | 30% | Assumed value |
| Concentration of H2 in anode | xh2a | 70% | Assumed value |
| Vapor pressure (0) of anode | Pvpa | 11.3 kPa | Calculated value |
| Total pressure of anode | Pa | ?? kPa | |
| Total volume of anode | Va | 2.4 L | Preset value |
| Relative humidity (RH) of cathode | Rhc | 45% | Assumed value |
| Temperature (° C.) of cathode | Tc | 65° C. | Common value when system is stopped |
| Concentration of O2 in cathode | xo2c | 21% | Common value when system is stopped |
| Concentration of N2 in cathode | xn2c | 79% | Common value when system is stopped |
| Vapor pressure (0) of cathode | Pvpc | 11.27 kPa | Calculated value |
| Total pressure of cathode | Pc | ?? kPa | |
| Total value of cathode | Vc | 4 L | Preset value |
| (Target) concentration of hydrogen | xh2 | 0% | |

Further, if the state when the system is stopped is as follows when the concentration of hydrogen that stays behind in an equilibrium state after a water generating reaction is to be maintained at 4%, a target pressure may be calculated by inserting the following values into the equations. When calculated based on the following values, the total pressure pc of the air residual space may be calculated to be 100 kPa. The total pressure pa of the hydrogen residual space may be calculated to be 108.7 kPa.

TABLE 5

| Classification | | Values | Note |
| --- | --- | --- | --- |
| Relative humidity (RH) of anode | rha | 45% | Assumed value |
| Temperature (° C.) of anode | ta | 65° C. | Common value when system is stopped |
| Concentration of N2 in anode | xn2a | 30% | Assumed value |
| Concentration of H2 in anode | xh2a | 70% | Assumed value |
| Vapor pressure (0) of anode | pvpa | 11.3 kPa | Calculated value |
| Total pressure of anode | pa | ?? kPa | |
| Total volume of anode | va | 2.4 L | Preset value |
| Relative humidity (RH) of cathode | rhc | 45% | Assumed value |
| Temperature (° C.) of cathode | tc | 65° C. | Common value when system is stopped |
| Concentration of O2 in cathode | xo2c | 21% | Common value when system is stopped |
| Concentration of N2 in cathode | xn2c | 79% | Common value when system is stopped |
| Vapor pressure (0) of cathode | pvpc | 11.27 kPa | Calculated value |
| Total pressure of cathode | pc | ?? kPa | |
| Total value of cathode | vc | 4 L | Preset value |
| (Target) concentration of hydrogen | xh2 | 4% | |

Further, if the state when the system is stopped is as follows when the concentration of hydrogen that stays behind in an equilibrium state after a water generating reaction is to be maintained at 0%, a target pressure may be calculated by inserting the following values into Equation 11 and into Equations 12-14. When calculated based on the following values, the concentration xh2a of hydrogen in the hydrogen residual space when the system is stopped may be calculated to be 70%.

TABLE 6

| Classification | | Values | Note |
| --- | --- | --- | --- |
| Relative humidity (RH) of anode | rha | 45% | Assumed value |
| Temperature (° C.) of anode | ta | 65° C. | Common value when system is stopped |
| Concentration of N2 in anode | xn2a | 30% | Assumed value |
| Concentration of H2 in anode | xh2a | ?? % | |
| Vapor pressure (0) of anode | pvpa | 3.3 kPa | Calculated value |
| Total pressure of anode | pa | 100 kPa | Common value when system is stopped |
| Total volume of anode | va | 2.4 L | Preset value |
| Relative humidity (RH) of cathode | rhc | 45% | Assumed value |
| Temperature (° C.) of cathode | tc | 65° C. | Common value when system is stopped |
| Concentration of O2 in cathode | xo2c | 21% | Common value when system is stopped |
| Concentration of N2 in cathode | xn2c | 79% | Common value when system is stopped |
| Vapor pressure (0) of cathode | pvpc | 11.27 kPa | Calculated value |
| Total pressure of cathode | pc | 100 kPa | Common value when system is stopped |

TABLE 6-continued

| Classification | | Values | Note |
|---|---|---|---|
| Total value of cathode | vc | 4 L | Preset value |
| (Target) concentration of hydrogen | xh2 | 0% | |

Further, if the state when the system is stopped is as follows when the concentration of hydrogen that stays behind in an equilibrium state after a water generating reaction is to be maintained at 4%, a target concentration may be calculated by inserting the following values into the equations. When calculated based on the following values, the concentration of hydrogen in the hydrogen residual space when the system is stopped may be calculated to be 76.5%.

TABLE 7

| Classification | | Values | Note |
|---|---|---|---|
| Relative humidity (RH) of anode | rha | 45% | Assumed value |
| Temperature (° C.) of anode | ta | 65° C. | Common value when system is stopped |
| Concentration of N2 in anode | xn2a | 24% | Assumed value |
| Concentration of H2 in anode | xh2a | ?? % | |
| Vapor pressure (0) of anode | pvpa | 11.3 kPa | Calculated value |
| Total pressure of anode | pa | 100 kPa | Common value when system is stopped |
| Total volume of anode | va | 2.4 L | Preset value |
| Relative humidity (RH) of cathode | rhc | 45% | Assumed value |
| Temperature (° C.) of cathode | tc | 65° C. | Common value when system is stopped |
| Concentration of O2 in cathode | xo2c | 21% | Common value when system is stopped |
| Concentration of N2 in cathode | xn2c | 79% | Common value when system is stopped |
| Vapor pressure (0) of cathode | pvpc | 11.27 kPa | Calculated value |
| Total pressure of cathode | pc | 100 kPa | Common value when system is stopped |
| Total value of cathode | vc | 4 L | Preset value |
| (Target) concentration of hydrogen | xh2 | 4% | |

Meanwhile, the above-mentioned controls, and more specifically, the controls to set the concentration of hydrogen to not more than the reference concentration, may be performed before the system is restarted after the system is stopped. For example, the controls may be performed shortly before the system is completely stopped, or immediately after the system is restarted.

The fuel cell system according to the present disclosure may adjust a ratio of the molecular number of oxygen in air that stays behind in the air residual space when the system is stopped, and the molecular number of hydrogen that stays behind in the hydrogen residual space to a specific reference range. Accordingly, the fuel cell system according to the present disclosure may prevent the problems due to the staying of oxygen or the excessive staying of hydrogen. The fuel cell system according to the present disclosure may do so through a method of specifically setting a volume of the residual spaces in advance when the system is designed, or through a method of actively supplying or discharging hydrogen or air when or after the system is completed.

The above description is a simple exemplification of the technical spirit of the present disclosure. The present disclosure may be variously corrected and modified by those having ordinary skill in the art to which the present disclosure pertains without departing from the essential features of the present disclosure. Therefore, the disclosed embodiments of the present disclosure do not limit the technical spirit of the present disclosure but are instead illustrative. The scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A fuel cell system employing a fuel cell stack having an air electrode, an electrolyte membrane, and a fuel electrode, the fuel cell system comprising:
an air residual space, from which air supplied to the air electrode is not discharged to stay behind therein when the fuel cell system is stopped, the air residual space communicating with the air electrode;
a hydrogen residual space, from which hydrogen supplied to the fuel electrode is not discharged to stay behind therein when the fuel cell system is stopped, the hydrogen residual space communicating with the fuel electrode; and
a control unit configured to control whether air is to be supplied to the air residual space and whether air is to be discharged from the air residual space, and control whether hydrogen is to be supplied to the hydrogen residual space and whether hydrogen is to be discharged from the hydrogen residual space,
wherein a residual ratio corresponds to a ratio of the molecular number of hydrogen that stays behind in the hydrogen residual space to the molecular number of oxygen in air that stays behind in the air residual space when the fuel cell system is stopped,
wherein when the residual ratio is greater than an upper limit of a reference range, the control unit performs a first control to supply air to the air residual space or a second control to discharge hydrogen from the hydrogen residual space at least until the residual ratio reaches the upper limit, and
wherein when the residual ratio is less than a lower limit of the reference range, the control unit performs a third control to discharge air from the air residual space or a fourth control to supply hydrogen to the hydrogen residual space at least until the residual ratio reaches the lower limit.

2. The fuel cell system of claim 1, wherein the air residual space is defined by a space between an air supply valve installed in an air supply line, through which air is supplied to the air electrode, to determine whether air is to be supplied based on whether the air supply line is opened or closed, and an air discharge valve installed in the air discharge line, through which air is discharged from the air electrode to the outside, to determine whether air is to be discharged based on whether the air discharge line is opened or closed.

3. The fuel cell system of claim 1, wherein the hydrogen residual space is defined by a space between a hydrogen supply valve installed in a hydrogen supply line, through which hydrogen is supplied to the fuel electrode, to determine whether hydrogen is to be supplied based on whether the hydrogen supply line is opened or closed, and a hydrogen discharge valve installed in the hydrogen discharge line, through which hydrogen is discharged from the fuel electrode to the outside, to determine whether hydrogen is to be discharged based on whether the hydrogen discharge line is opened or closed.

4. The fuel cell system of claim 1, wherein the reference range is set to a range in which oxygen and hydrogen pass through the electrolyte membrane to react with each other after the fuel cell system is stopped, so that oxygen is not left in the residual spaces.

5. The fuel cell system of claim 1, wherein the reference range is set to a range in which oxygen and hydrogen pass through the electrolyte membrane to react with each other after the fuel cell system is stopped, so that a concentration of hydrogen in the gases left in the residual spaces when the fuel cell system is restarted is not more than a reference concentration.

6. The fuel cell system of claim 1, wherein the reference range is 2 to 2.4.

7. The fuel cell system of claim 6, wherein the reference range is 2 to 2.2.

8. The fuel cell system of claim 1, wherein the control unit performs the first control based on the pressure of the gases in the air residual space or the molecular number of oxygen in the air residual space.

9. The fuel cell system of claim 1, wherein the control unit performs the third control based on the pressure of the gases in the air residual space or the molecular number of oxygen in the air residual space.

10. The fuel cell system of claim 1, wherein the control unit performs the second control based on the pressure of the gases in the hydrogen residual space or the molecular number of hydrogen in the hydrogen residual space.

11. The fuel cell system of claim 1, wherein the control unit performs the fourth control based on the pressure of the gases in the hydrogen residual space or the molecular number of hydrogen in the hydrogen residual space.

* * * * *